United States Patent [19]
Volz et al.

[11] Patent Number: 5,501,290
[45] Date of Patent: Mar. 26, 1996

[54] VEHICLE DRIP SHIELD

[76] Inventors: Arnold Volz, 12223 Scott Ave., Yuma, Ariz. 85367; Leann M. Herman, 11289 Joshua La., Yuma, Ariz. 85365

[21] Appl. No.: 333,719

[22] Filed: Nov. 3, 1994

[51] Int. Cl.$^6$ ..................................................... B62D 25/20
[52] U.S. Cl. .......................... 180/69.1; 184/106; 296/38; 220/573
[58] Field of Search .......................... 180/69.1; 184/106; 296/38, 39.1; 141/86, 87; 84/109; 220/573

[56] References Cited

U.S. PATENT DOCUMENTS

| | | | |
|---|---|---|---|
| 2,783,848 | 3/1957 | Beskid | 180/69.1 |
| 3,333,652 | 4/1965 | Tribuzi | 184/106 |
| 3,454,124 | 7/1969 | Niedek | 180/69.1 |
| 3,651,884 | 3/1972 | Dorries | 184/106 |
| 4,484,661 | 11/1984 | Evenson | 184/106 |
| 4,909,355 | 3/1990 | Ramos | 184/106 |
| 4,936,418 | 6/1990 | Clausen | 180/69.1 |
| 5,417,310 | 5/1995 | Halseth | 184/106 |

Primary Examiner—Margaret A. Focarino
Assistant Examiner—Min S. Yu

[57] ABSTRACT

A tough, semi-rigid, dimensionally-stable, hydrocarbon resistant film shaped to fit the underside configuration of a vehicle; a plurality of flexible securing straps affixed to the lateral edges of such film and extending outwardly therefrom, each of such straps having a fastening device on the outer end thereof to permit anchorage to the frame on which the invention is placed; and a removeable, disposable absorbent liner adapted to be inserted into spaced pockets in such film between such film and the underside of the vehicle to which such film is secured. The invention will capture and retain all liquid drippings such as grease, engine oil, hydraulic or brake fluids, etc. preventing contamination not only of the floor of a garage or car port where the vehicle is normally parked, but also of the driveway, street or other surfaces over which the vehicle passes.

3 Claims, 4 Drawing Sheets

VEHICLE DRIP SHIELD

BACKGROUND OF THE INVENTION

1. Field of the Invention

The present invention relates to environmental protection and more particularly pertains to a device which may be used to protect against drippings from automotive vehicles.

2. Description of the Prior Art

The use of floor protectors against vehicle drippings is known in the prior art. More specifically, devices heretofore devised and utilized for the purpose of containing vehicle drippings have been mats or the like intended to protect the surfaces of areas where a vehicle is standing, i.e. a garage floor, and are known to consist basically of familiar, expected and obvious structural configurations, notwithstanding the myriad of designs encompassed by the crowded prior art which have been developed for the fulfillment of countless objectives and requirements. Typical of such devices are those illustrated in U.S. Pat. Nos. 5,128,189; 4,801,005; 4,798,754; 4,671,024; and 3,722,626.

In this respect, the device according to the present invention substantially departs from the conventional concepts and designs of the prior art, and in so doing provides an apparatus primarily developed for the purpose of protecting any surface that a vehicle may be over, not only when garaged but also while moving, thereby protecting driveways, roads, etc. as well as garage floors.

Therefore, it can be appreciated that there exists a continuing need for new and improved devices which can be used to protect against vehicle drippings. In this regard, the present invention substantially fulfills this need.

SUMMARY OF THE INVENTION

In view of the foregoing disadvantages inherent in the known types of automotive drip devices now present in the prior art, the present invention provides an improved vehicle drip shield construction wherein the same can be utilized while a vehicle is moving as well as when standing still. As such, the general purpose of the present invention, which will be described subsequently in greater detail, is to provide a new and improved vehicle drip shield which has all the advantages of the prior art devices and none of the disadvantages.

To attain this, the present invention essentially comprises a tough, semi-rigid, dimensionally-stable, hydrocarbon resistant film shaped to fit the underside configuration of a vehicle; a plurality of flexible securing straps affixed to the lateral edges of such film and extending outwardly therefrom, each of such straps having a fastening device on the outer end thereof to permit anchorage to the vehicle frame on which the invention is placed; and a removeable, disposable absorbent liner adapted to be inserted into spaced pockets in such film and between such film and the underside of the vehicle to which such film is secured.

The drip shield of the invention will capture and retain all liquid drippings such as grease, engine oil, hydraulic or brake fluids, etc. preventing contamination not only of the floor of a garage or car port where the vehicle is normally parked, but also of the driveway, street or other surfaces over which the vehicle passes.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the disclosure of the application. The abstract is neither intended to define the invention of the application, which is measured by the claims, nor is it intended to be limiting as to the scope of the invention in any way.

It is therefore an object of the present invention to provide a new and improved vehicle drip shield which has all the advantages of the prior art devices and none of the disadvantages.

It is another object of the present invention to provide a new and improved vehicle drip shield which may be easily and efficiently manufactured and marketed.

It is a further object of the present invention to provide a new and improved vehicle drip shield which is of a durable and reliable construction.

An even further object of the present invention is to provide a new and improved vehicle drip shield which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved vehicle drip shield which provides in the apparatuses and methods of the prior art some of the advantages thereof, while simultaneously overcoming some of the disadvantages normally associated therewith.

Still another object of the present invention is to provide a new and improved vehicle drip shield which is affixed to a vehicle body.

Yet another object of the present invention is to provide a new and improved vehicle drip shield which protects all surfaces over which the vehicle passes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
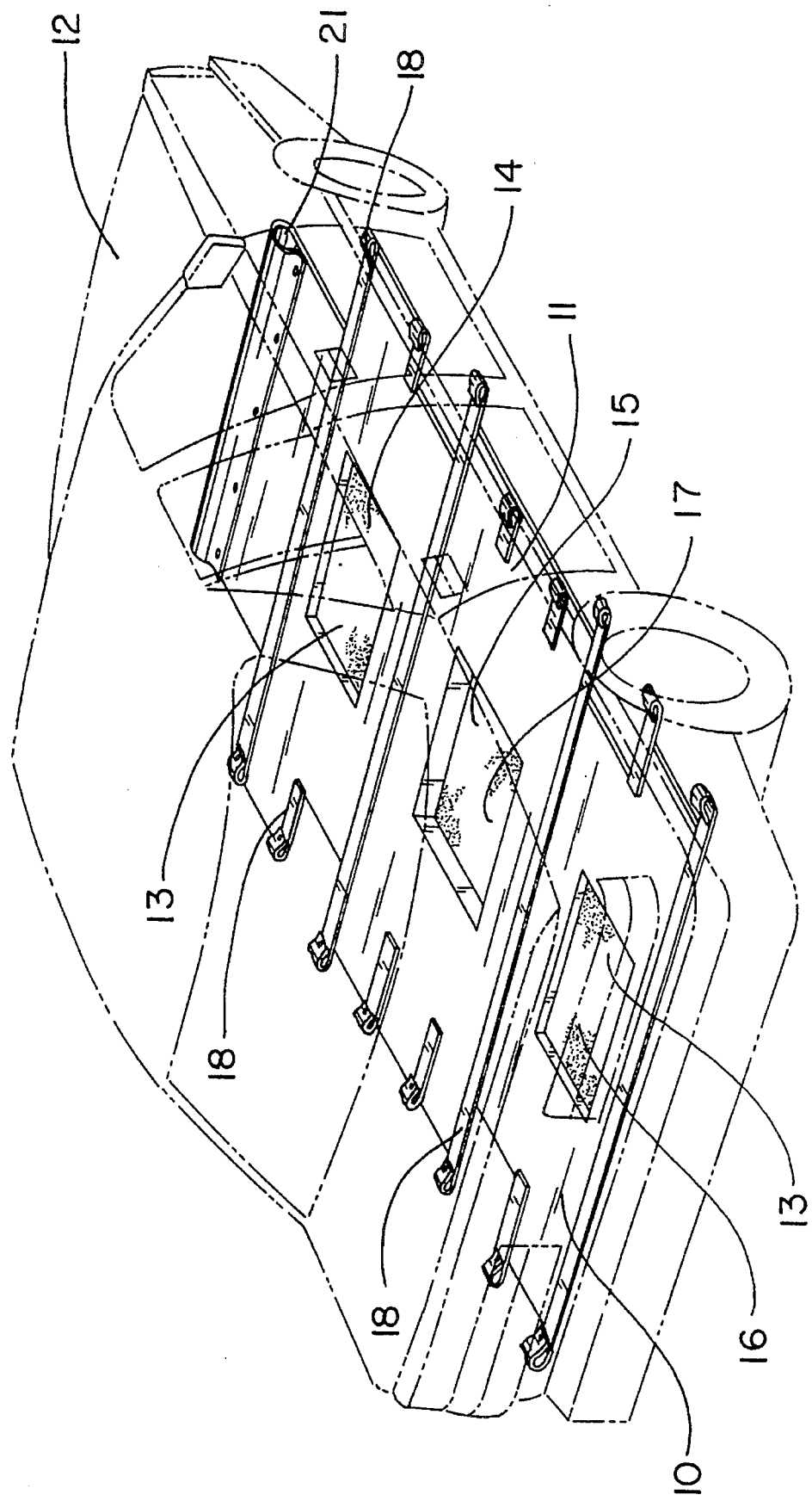
FIG. 1 is a perspective view of the present invention in place on the underside of a vehicle (shown in broken lines).
Figure 2:
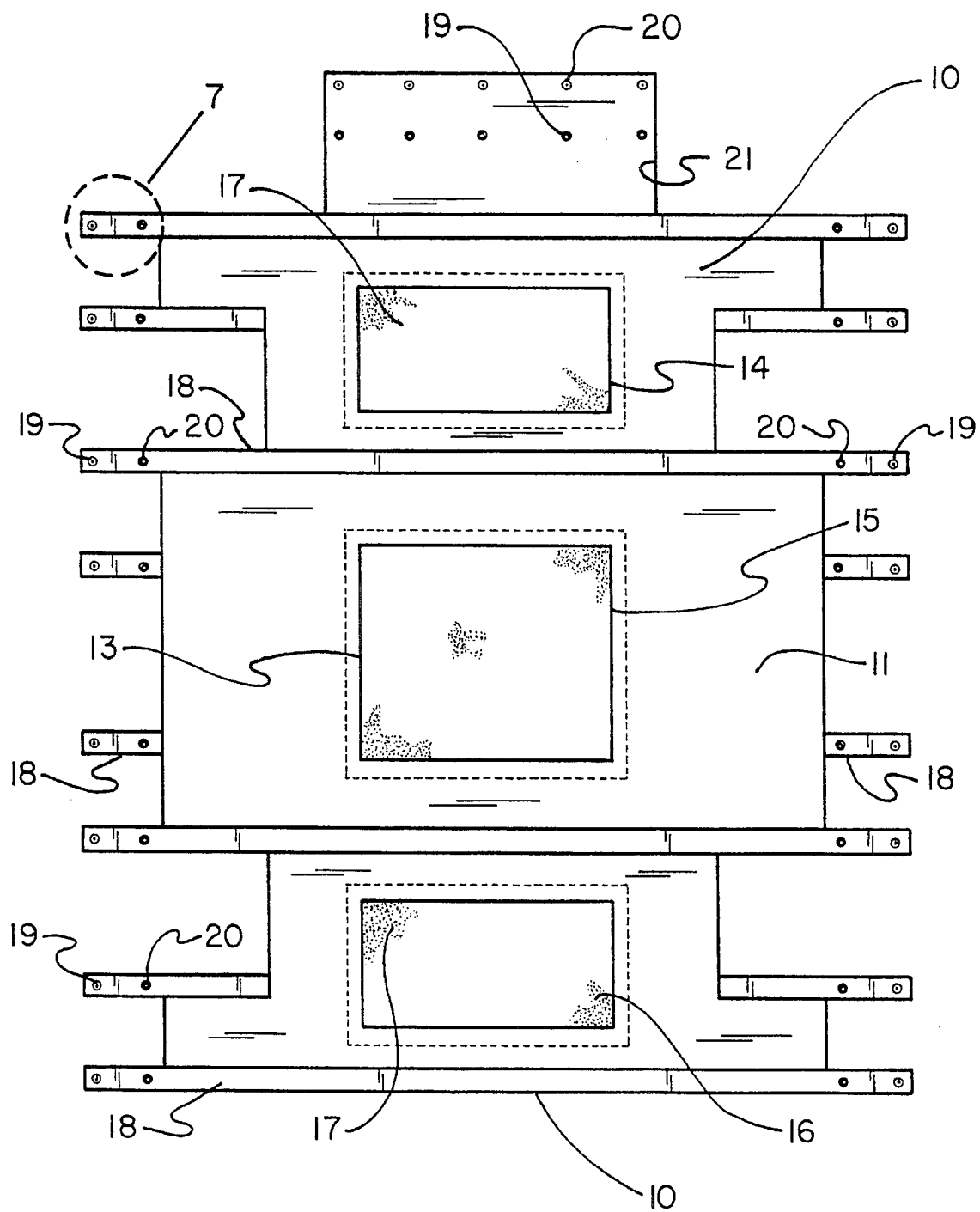
FIG. 2 is a top plan view of the invention.

With reference now to the drawings, and in particular to FIGS. 1 and 2 thereof, a new and improved vehicle drip shield embodying the principles and concepts of the present invention and generally designated by the reference numeral 10 will be described.

More specifically, it will be noted that the drip shield 10 is formed of a semi-rigid impervious tough film member 11 configured to the underside the vehicle 12 to which it is to be attached. Such film member 11 is generally flat and sheet-like except for recessed pockets 13 under those areas of the vehicle prone to drip or otherwise discharge waste products from such vehicle. Such pockets 13 will vary from vehicle to vehicle since the shield 10 is specifically designed to fit a given vehicle. As shown in FIGS. 1 and 2 hereof, one pocket 13 is configured to fit under the oil pan 14, one to fit under the transmission 15 and a third under the rear axle housing 16. Inserted into the interior of each of such pockets 13 is an absorbent fibrous liner 17 designed to catch and entrap the vehicle fluids which drip down therein. Liners 17 are removeable and replaceable as needed. The entire impervious film member 11 is replaceably secured to the frame of the vehicle 12 by a plurality of flexible strap members 18 extending transversely across and/or secured to the lateral edges of such member 11. Such strap members 18 are provided with means to secure the ends of such straps around the frame members of the vehicle 12 to which member 11 is mounted. As shown in these drawings, such fastening means consist of a snap and associated button 19 and 20. The specific type of fastener is not critical, e.g. the strap members 18 could be doubled with a buckle on one segment and a bare end on the other. A securing flap 21 is provided on the forward end of member 11 to wrap around and secure to a cross-frame member, e.g a torsion bar extending transversely at the front end of vehicle 12 the securing flap having spaced and parallel longitudinal edges and defining a transverse width extending between the longitudinal edges, with one of the longitudinal edges being coupled to the forward end of the film member, wherein a longitudinal length of the securing flap is substantially greater than the transverse width thereof.

Figure 3:
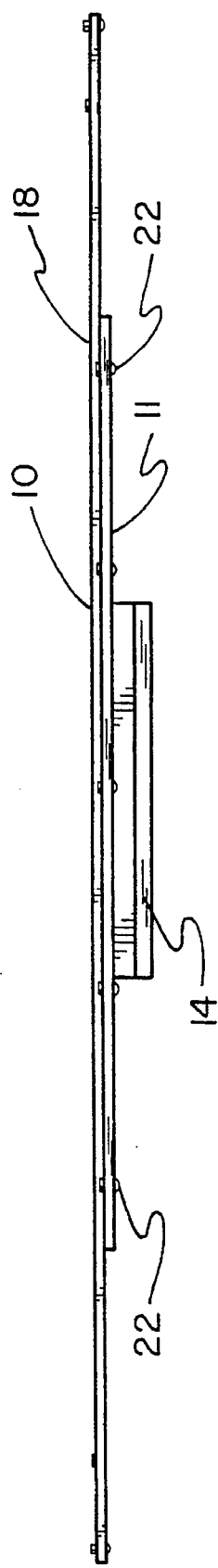
FIG. 3 is a front plan view of the device of the present invention.
Figure 4:
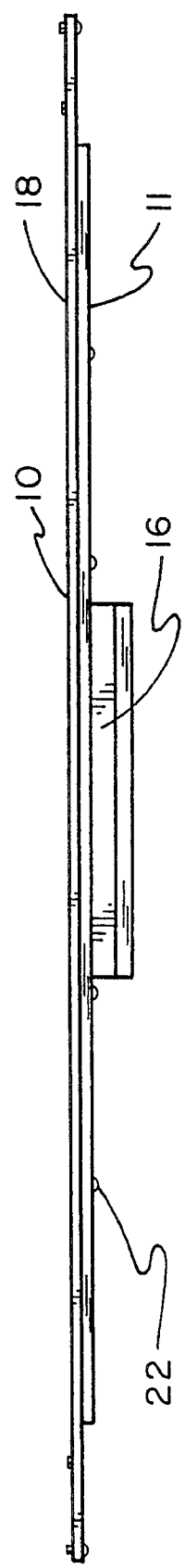
FIG. 4 is a rear plan view of such device.
Figure 5:
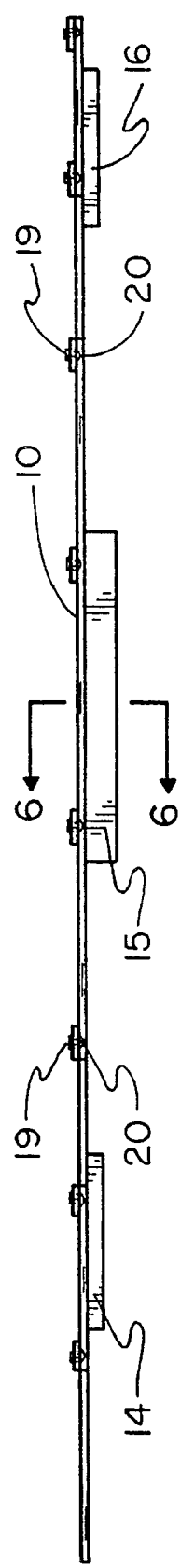
FIG. 5 is a side plan view of the device.

FIGS. 3, 4 and 5 are front, rear and side views respectively of the shield 10 showing the fastening of the strap members 18 to film member 11, here illustrated as by the use of rivets 22 although alternatives such as adhesive could be used.

Figure 6:
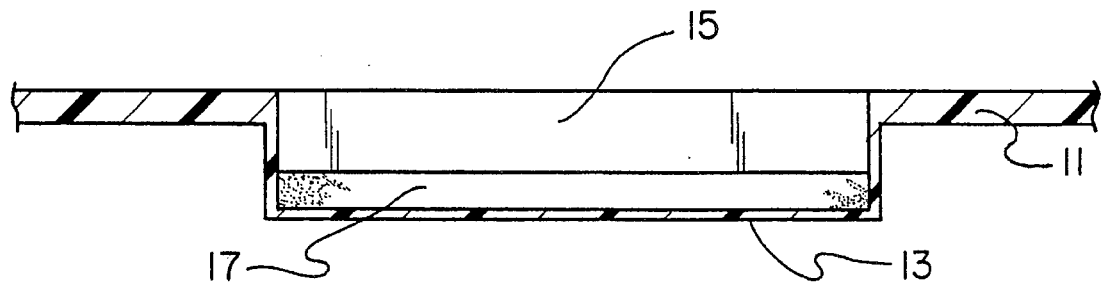
FIG. 6 is a sectional view taken on line 6—6 of FIG. 5.

FIG. 6 is a sectional view on line 6—6 of FIG. 5, showing the fibrous absorbent liner 17 inserted in the pocket 13 of film member 11 under the central pocket 13 covering the transmission 15.

Figure 7:
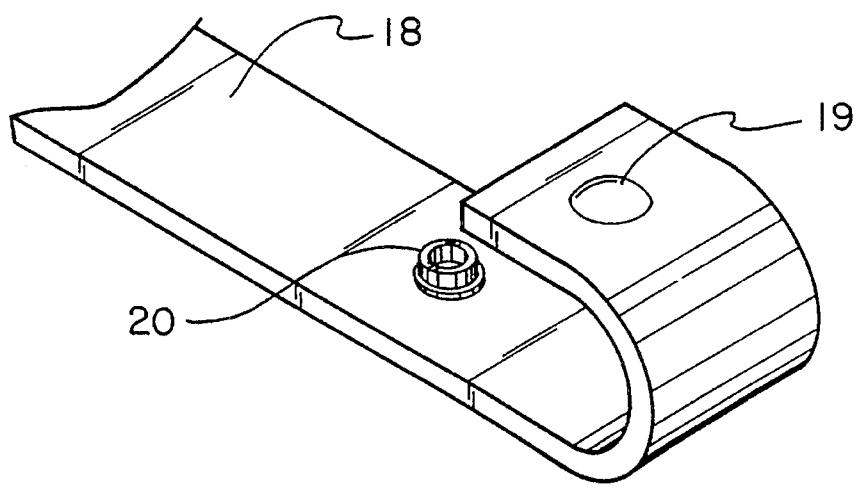
FIG. 7 is an enlarged perspective view of a strap end showing the snap closure thereon.

FIG. 7 is a detail view of the end of a strap 18 showing the snap 19 and button 20.

Preferably the impervious semi-rigid film member is formed of a material such as PERMALON® X-210 or similar hydrocarbon-resistant material, while the fibrous absorbent liners are formed of non-woven glass-fiber, cellulose fibers or the like. The film member also functions to keep the engine of the vehicle warmer in cold weather.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved vehicle drip shield having a top middle portion which comprises: a flexible, semi-rigid tough film member configured to fit the underside of a vehicle frame; at least one pocket member formed in said film member under a drip point on said vehicle; a plurality of strap means securing said film member to said vehicle frame; at least one strap means extending across the top middle portion of the shield; a disposable absorbent liner member inserted in said pocket member; and a continuous securing flap projecting from a forward end of the film member for wrapping and securing about a component of the vehicle frame, the securing flap having spaced and parallel longitudinal edges and defining a transverse width extending between the longitudinal edges, with one of the longitudinal edges being coupled to the forward end of the film member, wherein a longitudinal length of the securing flap is substantially greater than the transverse width thereof.

2. A new and improved vehicle drip shield having a top middle portion which comprises: a substantially flat, hydrocarbon-resistant, semi-rigid, tough film member; a plurality of pockets formed in said film member and depending therefrom; a removable absorbent fibrous liner inserted in each of said pocket members; a flexible strap means secured to the lateral surfaces of said film member to hold said film member to the under surface of a vehicle frame at least one strap means extending across the top middle portion of the shield; and a continuous securing flap projecting from a forward end of the film member for wrapping and securing about a component of the vehicle frame, the securing flap having spaced and parallel longitudinal edges and defining a transverse width extending between the longitudinal edges, with one of the longitudinal edges being coupled to the forward end of the film member, wherein a longitudinal length of the securing flap is substantially greater than the transverse width thereof.

3. A drip shield as in claim 2 wherein said strap means each terminate in a snap and button fastener.

\* \* \* \* \*